(12) United States Patent  
Ding et al.

(10) Patent No.: US 11,206,556 B2  
(45) Date of Patent: Dec. 21, 2021

(54) POWER OUTAGE PROCESSING METHOD AND CONNECTION RELATIONSHIP OBTAINING METHOD AND DEVICE

(71) Applicant: HUAWEI TECHNOLOGIES CO., LTD., Shenzhen (CN)

(72) Inventors: Zhenghu Ding, Shanghai (CN); Jiang Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/423,189

(22) Filed: May 28, 2019

(65) Prior Publication Data

US 2019/0281477 A1    Sep. 12, 2019

Related U.S. Application Data

(63) Continuation of application No. PCT/CN2016/107754, filed on Nov. 29, 2016.

(51) Int. Cl.
| | |
|---|---|
| *H04W 72/00* | (2009.01) |
| *H04B 1/40* | (2015.01) |
| *H04B 17/00* | (2015.01) |
| *H04W 24/04* | (2009.01) |
| *H04W 52/02* | (2009.01) |
| *H04W 88/08* | (2009.01) |
| *H04W 52/00* | (2009.01) |

(52) U.S. Cl.
CPC ........... *H04W 24/04* (2013.01); *H04W 52/00* (2013.01); *H04W 52/02* (2013.01); *H04W 52/0206* (2013.01); *H04W 88/08* (2013.01); *H04W 88/085* (2013.01); *Y02D 30/70* (2020.08)

(58) Field of Classification Search
CPC ...... H04W 24/04; H04W 52/02; H04W 88/08
USPC ......................................................... 455/450
See application file for complete search history.

(56) References Cited

U.S. PATENT DOCUMENTS 5,410,740 A  *  4/1995  Hagstrom ............. H04W 88/08
                                                    455/67.11
6,321,081 B1 *  11/2001  Lee ........................ H04W 24/00
                                                    455/423

(Continued)

FOREIGN PATENT DOCUMENTS

CN           1691458 A        11/2005
CN         100377418 C         5/2006

(Continued)

*Primary Examiner* — Mark G. Pannell
(74) *Attorney, Agent, or Firm* — Hauptman Ham, LLP

(57) ABSTRACT

A power outage processing method: receiving, by a controller in a base station, notification information sent by a first power source, where the notification information is used to indicate that a power outage has occurred on the first power source; the base station includes M radio units, and the M radio units are supplied with power by N power sources, where each power source is connected to at least one radio unit; and the first power source is one of the N power sources, and the N power sources are all supplied with power by using a power grid, determining, by the controller based on connection relationships between the N power sources and the M radio units, a radio unit connected to the first power source; and instructing, by the controller, all or some of radio units connected to the first power source to reduce power consumption.

12 Claims, 5 Drawing Sheets

A controller in a base station receives notification information sent by a first power source, where the notification information is used to indicate that a power outage has occurred on the first power source; the base station includes M radio units, and the M radio units are supplied with power by N power sources, where each power source is connected to at least one radio unit, to supply power to the at least one radio unit; and the first power source is one of the N power sources, and the N power sources are all supplied with power by using a power grid, where M is an integer greater than or equal to 2, and N is a positive integer The controller determines, based on connection relationships between the N power sources and the M radio units, a radio unit connected to the first power source The controller instructs all or some of radio units connected to the first power source to reduce power consumption

(56) References Cited

U.S. PATENT DOCUMENTS

| | | | |
|---|---|---|---|
| 8,116,815 B2 | 2/2012 | Loh | |
| 8,509,256 B1 * | 8/2013 | Walston | H04W 52/0296 370/419 |
| 8,538,352 B2 | 9/2013 | Hirata | |
| 10,014,696 B2 * | 7/2018 | Toya | H02J 7/0068 |
| 2007/0232363 A1 | 10/2007 | Kimura et al. | |
| 2009/0270132 A1 * | 10/2009 | Nakayama | H04W 24/04 455/561 |
| 2011/0065396 A1 * | 3/2011 | Hirata | H04W 52/0261 455/77 |
| 2012/0009926 A1 * | 1/2012 | Hevizi | H04W 52/0203 455/436 |
| 2013/0114488 A1 * | 5/2013 | Fang | H04W 52/0206 370/311 |
| 2013/0148283 A1 * | 6/2013 | Forutanpour | H04Q 9/00 361/679.31 |
| 2014/0065949 A1 * | 3/2014 | Wilhite | H04B 1/745 455/8 |
| 2014/0171063 A1 | 6/2014 | Mori | |
| 2015/0163684 A1 | 6/2015 | Unno | |
| 2017/0181080 A1 | 6/2017 | Tang et al. | |
| 2019/0148971 A1 * | 5/2019 | Bae | H02J 7/025 320/108 |

FOREIGN PATENT DOCUMENTS

| | | |
|---|---|---|
| CN | 102264090 A | 11/2011 |
| CN | 102572902 A | 7/2012 |
| CN | 104427542 A | 3/2015 |
| CN | 105472786 A | 4/2016 |
| EP | 2733978 A1 | 5/2014 |
| JP | 2005261094 A | 9/2005 |
| JP | 2011066593 A | 3/2011 |
| JP | 2014120802 A | 6/2014 |
| JP | 2015015538 A | 1/2015 |

* cited by examiner

201 — A controller in a base station receives notification information sent by a first power source, where the notification information is used to indicate that a power outage has occurred on the first power source; the base station includes M radio units, and the M radio units are supplied with power by N power sources, where each power source is connected to at least one radio unit, to supply power to the at least one radio unit; and the first power source is one of the N power sources, and the N power sources are all supplied with power by using a power grid, where M is an integer greater than or equal to 2, and N is a positive integer 202 — The controller determines, based on connection relationships between the N power sources and the M radio units, a radio unit connected to the first power source 203 — The controller instructs all or some of radio units connected to the first power source to reduce power consumption

FIG. 2

POWER OUTAGE PROCESSING METHOD AND CONNECTION RELATIONSHIP OBTAINING METHOD AND DEVICE

CROSS-REFERENCE TO RELATED APPLICATIONS

This application is a continuation of International Application No. PCT/CN2016/107754, filed on Nov. 29, 2016, which is hereby incorporated by reference in its entirety.

TECHNICAL FIELD

Embodiments of the present invention relate to the field of communications technologies, and in particular, to a power outage processing method and a connection relationship obtaining method and device.

BACKGROUND

Currently, in addition to a common power module supplied with power by a mains supply, a storage battery or the like is usually further configured for a radio base station as a standby power system. When a mains supply outage occurs, the standby power system may continue to supply power to a base station device. However, a capacity of the standby power system is limited, and duration for which the base station device keeps working relying on the standby power system is also limited. Therefore, when the mains supply outage occurs, power consumption of a primary base station device may be reduced to prolong power supply duration of the standby power system. Power consumption of the base station is mainly caused by a radio unit (Radio Unit, RU). Therefore, a main method for reducing power consumption of the base station device currently is to reduce power consumption of the RU. A general method is as follows: When a mains supply outage occurs, power consumption of all RUs of the base station is reduced to prolong power supply duration of the standby power system.

Currently, there are generally two power supply scenarios for the base station: a centralized power supply scenario and a distributed power supply scenario. In the centralized power supply scenario, a same set of power system and a same set of standby power system are used to supply power to primary devices of the base station. When mains supply is normal, the same set of power system is used to supply power to all the primary devices. When a mains supply outage occurs, the same set of standby power system is used to supply power to all the primary devices. In the distributed power supply scenario, a plurality of sets of power systems and a plurality of sets of standby power systems are used to supply power to primary devices of the base station. When a mains supply outage occurs on some devices, standby power systems corresponding to the devices are used to supply power to the devices, and other devices that are supplied with power normally by mains supply still use original mains supply manners. The primary devices of the base station mainly include a building baseband unit (Building Base band Unit, BBU) and RUs.

Currently, if a power consumption reduction manner used when a mains supply outage occurs is applied to a distributed power supply scenario, once a power outage occurs, a base station instructs all RUs of the base station to reduce power consumption. However, the power outage may occur only on some of power sources that supply power to the base station, that is, some RUs may continue to work normally with mains supply. Therefore, in a current processing manner, power consumption of an RU supplied with power normally may also be reduced, resulting in a performance loss of the RU.

SUMMARY

Embodiments of the present invention provide a power outage processing method and a connection relationship obtaining method and device, to provide a power outage processing manner used in a distributed power supply scenario, to perform different processing on different RUs depending on cases.

According to a first aspect, a power outage processing method is provided, where the method is implemented by a controller in a base station. The method includes: receiving, by the controller in the base station, notification information sent by a first power source, where the notification information is used to indicate that a power outage has occurred on the first power source; determining, by the controller based on connection relationships between N power sources and M radio units, a radio unit connected to the first power source; and instructing, by the controller, all or some of radio units connected to the first power source to reduce power consumption, where the base station includes the M radio units, and the M radio units are supplied with power by N power sources, where each power source is connected to at least one radio unit, to supply power to the at least one radio unit; and the first power source is one of the N power sources, and the N power sources are all supplied with power by using a power grid, where M is an integer greater than or equal to 2, and N is a positive integer.

In this embodiment of the present invention, if determining that a power outage has occurred on the first power source, the controller determines, based on the connection relationship between the power sources and the radio units, the radio unit connected to the first power source, and instructs all or some of the radio units connected to the first power source to reduce power consumption, that is, instructs a radio unit affected by a power source on which a power outage has occurred to reduce power consumption. For a radio unit connected to a power source on which no power outage has occurred, the controller does not instruct the radio unit to reduce power consumption. In this way, power consumption of a radio unit connected to a power source on which a power outage has occurred, and working time of the radio unit is prolonged; and performance of a radio unit supplied with power normally can be ensured, and the radio unit supplied with power normally can continue to work normally without being affected.

With reference to the first aspect, in a first possible implementation of the first aspect, after the controller instructs all or some of the radio units connected to the first power source to reduce power consumption, if the controller determines that the first power source has recovered from the power outage, the controller instructs the radio units with reduced power consumption that are connected to the first power source to restore to the original power consumption. Alternatively, after the controller instructs all or some of the radio units connected to the first power source to reduce power consumption, if the controller determines that the radio units with reduced power consumption that are connected to the first power source have entered a working mode in which power consumption reduction is not allowed, the controller instructs the radio units with reduced power consumption that are connected to the first power source to restore to the original power consumption.

After power consumption of all or some of the RUs connected to the first power source is reduced, if the first power source has recovered from the power outage, it indicates that the RUs connected to the first power source can work normally with mains supply, so that the controller may instruct the RUs whose power consumption is reduced previously, to restore to the original power consumption, so as to enable the RUs to work normally as soon as possible, and a service terminated or interrupted due to power consumption reduction may continue as soon as possible. Alternatively, even if the first power source has not recovered from the power outage, but if the RUs with reduced power consumption that are connected to the first power source have entered a working mode in which power consumption reduction is not allowed, the controller may also instruct the RUs to restore to the original power consumption. If the RUs enter the working mode in which power consumption reduction is not allowed from a working mode in which power consumption reduction is allowed, it may indicate that the RUs need to do more important work, or indicate that a system or a user has a specific requirement. Therefore, the controller may instruct the RUs to restore to the original power consumption, to ensure that the RUs can work normally.

With reference to the first aspect or the first possible implementation of the first aspect, in a second possible implementation of the first aspect, if the controller needs to respectively control different RUs based on the connection relationships between the N power sources and the M RUs, the controller needs to obtain the connection relationships between the N power sources and the M RUs. Obtaining, by the controller, the connection relationships between the N power sources and the M RUs includes but is not limited to the following method: receiving, by the controller, a connection relationship, sent by each of the N power sources, between the power source and the at least one radio unit; and/or receiving, by the controller, a connection relationship, sent by each of the M radio units, between the radio unit and a power source. To be specific, the controller may obtain the connection relationships between the N power sources and the M RUs based on the connection relationships sent by the N power sources and/or the connection relationships sent by the M RUs.

The RUs and the power sources are connected to each other. An RU knows clearly which power source is connected to the RU, and a power source also knows clearly which RU is connected to the power source. The RUs or the power sources send respective connection relationships to the controller, so that all connection relationships received by the controller are relatively accurate. The controller only needs to integrate all the received connection relationships to obtain the connection relationships between the N power sources and the M RUs. The method is relatively simple.

According to a second aspect, a connection relationship obtaining method is provided, where the method is implemented by a first device. The method includes: obtaining, by the first device, a connection relationship between the first device and a second device; and sending, by the first device, the obtained connection relationship to a controller of a base station, where the base station includes M radio units, and the M radio units are supplied with power by N power sources, where each power source is connected to at least one radio unit, to supply power to the at least one radio unit, and the N power sources are all supplied with power by using a power grid; and the first device is one of the M radio units, and the second device is a power source that supplies power to a radio unit used as the first device, or the first device is one of the N power sources, and the second device is a radio unit supplied with power by a power source used as the first device, where M is an integer greater than or equal to 2, and N is a positive integer.

To be specific, the first device may be an RU or may be a power source. If the first device is an RU, the RU sends a connection relationship between the RU and a power source to the controller, that is, notifies the controller which power source is connected to the RU. The M RUs are disposed in the base station. If each RU sends a connection relationship between the RU and a power source to the controller, the controller may determine connection relationships between the M RUs and the N power sources. Alternatively, if the first device is a power source, the power source sends a connection relationship between the power source and an RU to the controller, that is, notifies the controller which RU is connected to the power source. The N power sources are disposed in the base station. If each power source sends a connection relationship between the power source and an RU to the controller, the controller may determine connection relationships between the M RUs and the N power sources. In this embodiment of the present invention, the RUs and/or the power sources all may send respective connection relationships to the controller, and the controller integrates all received connection relationships to obtain the connection relationships between the M RUs and the N power sources. The method is relatively simple.

With reference to the second aspect, in a first possible implementation of the second aspect, the obtaining, by the first device, a connection relationship between the first device and a second device may be implemented in the following manner: obtaining, by the first device, the connection relationship between the first device and the second device by using a PLC function.

Currently, not every RU is connected to a power source through a monitor cable, but each RU is connected to a power source through a power cable. Generally, the power cable can only be used to transmit an electrical signal, and cannot be used to transmit a signal of another type. To enable the RU to obtain a connection relationship in a manner of intercommunication with the power source, or to enable the power source to obtain a connection relationship in a manner of intercommunication with the RU, in this embodiment of the present invention, the RU and the power source may be improved, so that the RU and the power source can transmit other information in addition to an electrical signal through the power cable. For example, both the RU and the power source are improved to support the PLC function. When the power source and the RU that are connected to each other both support the PLC function, the RU and the power source may communicate with each other by using the PLC function through the power cable, to know a physical connection relationship of each other. Certainly, this embodiment of the present invention is not limited to the PLC function, and any function that enables the RU and the power source to communicate with each other is applicable.

With reference to the second aspect or the first possible implementation of the second aspect, in a second possible implementation of the second aspect, if the first device is one of the N power sources, the method further includes: determining, by the first device, that a power outage has occurred on the first device; and sending, by the first device, notification information to the controller, where the notification information is used to indicate that the power outage has occurred on the first power source.

If the first device is a power source, if the power source determines that a power outage has occurred on the power source, the power source may send notification information to the controller in a timely manner, so that the controller knows a status of the power source in a timely manner. If determining that the power outage has occurred on the power source, the controller may start power consumption reduction processing on an RU connected to the power source.

With reference to the second aspect or the first possible implementation of the second aspect, in a third possible implementation of the second aspect, if the first device is one of M radio units, the method further includes: receiving, by the first device, first indication information sent by the controller, where the first indication information is used to instruct the first device to reduce power consumption.

If the first device is an RU, if a power outage has occurred on a power source connected to the RU, the RU may switch to be supplied with power by a standby power system, and the controller may instruct the RU to reduce power consumption, to prolong power supply duration of the standby power system that supplies power to the RU.

With reference to the third possible implementation of the second aspect, in a fourth possible implementation of the second aspect, the method further includes: receiving, by the first device, second indication information sent by the controller, where the second indication information is used to instruct the first device to restore to the original power consumption.

If the first device is an RU, and power consumption of the RU has been reduced through the instruction of the controller. If a power source connected to the RU has recovered from a power outage, or the RU enters a working mode in which power consumption reduction is not allowed from a working mode in which power consumption reduction is allowed, or a cell in which the RU is located enters a working mode in which power consumption reduction is not allowed from a working mode in which power consumption reduction is allowed, the controller instructs the RU to restore to original power consumption, to meet a service requirement.

According to a third aspect, a controller is provided, where the controller is a controller of a base station. The controller includes a transceiver and a processor. The transceiver is configured to receive notification information sent by a first power source, where the notification information is used to indicate that a power outage has occurred on the first power source. The processor is configured to determine, based on connection relationships between N power sources and M radio units, a radio unit connected to the first power source; and instruct all or some of radio units connected to the first power source to reduce power consumption. The base station includes the M radio units, and the M radio units are supplied with power by the N power sources, where each power source is connected to at least one radio unit, to supply power to the at least one radio unit; and the first power source is one of the N power sources, and the N power sources are all supplied with power by using a power grid, where M is an integer greater than or equal to 2, and N is a positive integer.

With reference to the third aspect, in a first possible implementation of the third aspect, the processor is further configured to: after instructing all or some of the radio units connected to the first power source to reduce power consumption, if determining that the first power source has recovered from the power outage, instruct the radio units with reduced power consumption that are connected to the first power source to restore to the original power consumption; or after instructing all or some of the radio units connected to the first power source to reduce power consumption, if determining that the radio units with reduced power consumption that are connected to the first power source have entered a working mode in which power consumption reduction is not allowed, instruct the radio units with reduced power consumption that are connected to the first power source to restore to the original power consumption.

With reference to the third aspect or the first possible implementation of the third aspect, in a second possible implementation of the third aspect, the transceiver is further configured to receive a connection relationship, sent by each of the N power sources, between the power source and the at least one radio unit; and/or receive a connection relationship, sent by each of the M radio units, between the radio unit and a power source. The connection relationship herein sent by each power source is only a connection relationship between the power source and an RU. In other words, one power source sends only a connection relationship between the power source and an RU. It is the same as an RU. One RU sends only a connection relationship between the RU and a power source.

According to a fourth aspect, a connection relationship obtaining device is provided, where the device includes a processor and a transceiver. The processor is configured to obtain a connection relationship between the connection relationship obtaining device and a second device. The transceiver is configured to send the obtained connection relationship to a controller of a base station. The base station includes M radio units, and the M radio units are supplied with power by N power sources, where each power source is connected to at least one radio unit, to supply power to the at least one radio unit, and the N power sources are all supplied with power by using a power grid. The connection relationship obtaining device is one of the M radio units, and the second device is a power source that supplies power to the radio unit used as the connection relationship obtaining device; or the connection relationship obtaining device is one of the N power sources, and the second device is a radio unit supplied with power by the power source used as the connection relationship obtaining device, where M is an integer greater than or equal to 2, and N is a positive integer.

With reference to the fourth aspect, in a first possible implementation of the fourth aspect, that the processor is configured to obtain a connection relationship between the connection relationship obtaining device and a second device includes: obtaining the connection relationship between the connection relationship obtaining device and the second device by using a PLC function.

With reference to the fourth aspect or the first possible implementation of the fourth aspect, in a second possible implementation of the fourth aspect, if the connection relationship obtaining device is any one of the N power sources, the processor is further configured to determine that a power outage has occurred on the connection relationship obtaining device. The transceiver is further configured to send notification information to the controller, where the notification information is used to indicate that the power outage has occurred on the connection relationship obtaining device.

With reference to the fourth aspect or the first possible implementation of the fourth aspect, in a third possible implementation of the fourth aspect, if the connection relationship obtaining device is one of the M radio units, the transceiver is further configured to receive first indication information sent by the controller, where the first indication information is used to instruct the connection relationship obtaining device to reduce power consumption.

With reference to the third possible implementation of the fourth aspect, in a fourth possible implementation of the fourth aspect, the transceiver is further configured to receive second indication information sent by the controller, where the second indication information is used to instruct the connection relationship obtaining device to restore to the original power consumption.

According to a fifth aspect, a controller is provided, where the controller is a controller of a base station, and the controller may include a functional unit configured to implement the method in any one of the first aspect or the possible implementations of the first aspect.

According to a sixth aspect, a connection relationship obtaining device is provided, where the connection relationship obtaining device may include a functional unit configured to implement the method in any one of the second aspect or the possible implementations of the second aspect.

According to a seventh aspect, a computer storage medium is provided, configured to store a computer software instruction used by the foregoing controller. The computer software instruction includes a program designed for the controller for implementing the method in any one of the first aspect and the possible implementations of the first aspect.

According to an eighth aspect, a computer storage medium is provided, configured to store a computer software instruction used by the connection relationship obtaining device. The computer software instruction includes a program designed for the connection relationship obtaining device for implementing the method in any one of the second aspect and the possible implementations of the second aspect.

In the embodiments of the present invention, different RUs may be controlled separately. In this way, power consumption of an RU connected to a power source on which a power outage has occurred can be reduced, and working time of the RU can be prolonged; and performance of an RU supplied with power normally can be ensured, and the RU supplied with power normally can continue to work normally without being affected.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may derive other drawings from these accompanying drawings without creative efforts.

FIG. 2 is a flowchart of a power outage processing method according to an embodiment of the present invention;

DESCRIPTION OF EMBODIMENTS

To make the objective, technical solutions, and advantages of the embodiments of the present invention clearer, the following clearly and completely describes the technical solutions of the embodiments of the present invention with reference to accompanying drawings in the embodiments of the present invention.

The following describes some terms in the present invention to facilitate understanding by a person skilled in the art.

(1) A network device may be, for example, a base station (for example, an access point), and may be specifically a device in communication with a wireless terminal over an air interface in an access network by using one or more sectors. The base station may be configured to mutually convert a received over-the-air frame and an Internet Protocol (IP) packet and serve as a router between the wireless terminal and a rest portion of the access network, where the rest portion of the access network may include an IP network. The base station may further coordinate attribute management of the air interface. For example, the base station may be an evolved NodeB (NodeB, eNB, or e-NodeB, evolutional Node B) in a Long Term Evolution (Long Term Evolution, LTE) system, a Long Term Evolution Advanced (LTE-Advanced, LTE-A) system, or the like. This is not limited in the embodiments of the present invention.

(2) The terms "system" and "network" may be used interchangeably in the embodiments of the present invention. "A plurality of" means at least two. The term "and/or" describes an association relationship for describing associated objects and represents that three relationships may exist. For example, A and/or B may represent the following three cases: Only A exists, both A and B exist, and only B exists. In addition, unless otherwise specified, the character "/" generally indicates an "or" relationship between the associated objects.

Figure 1:
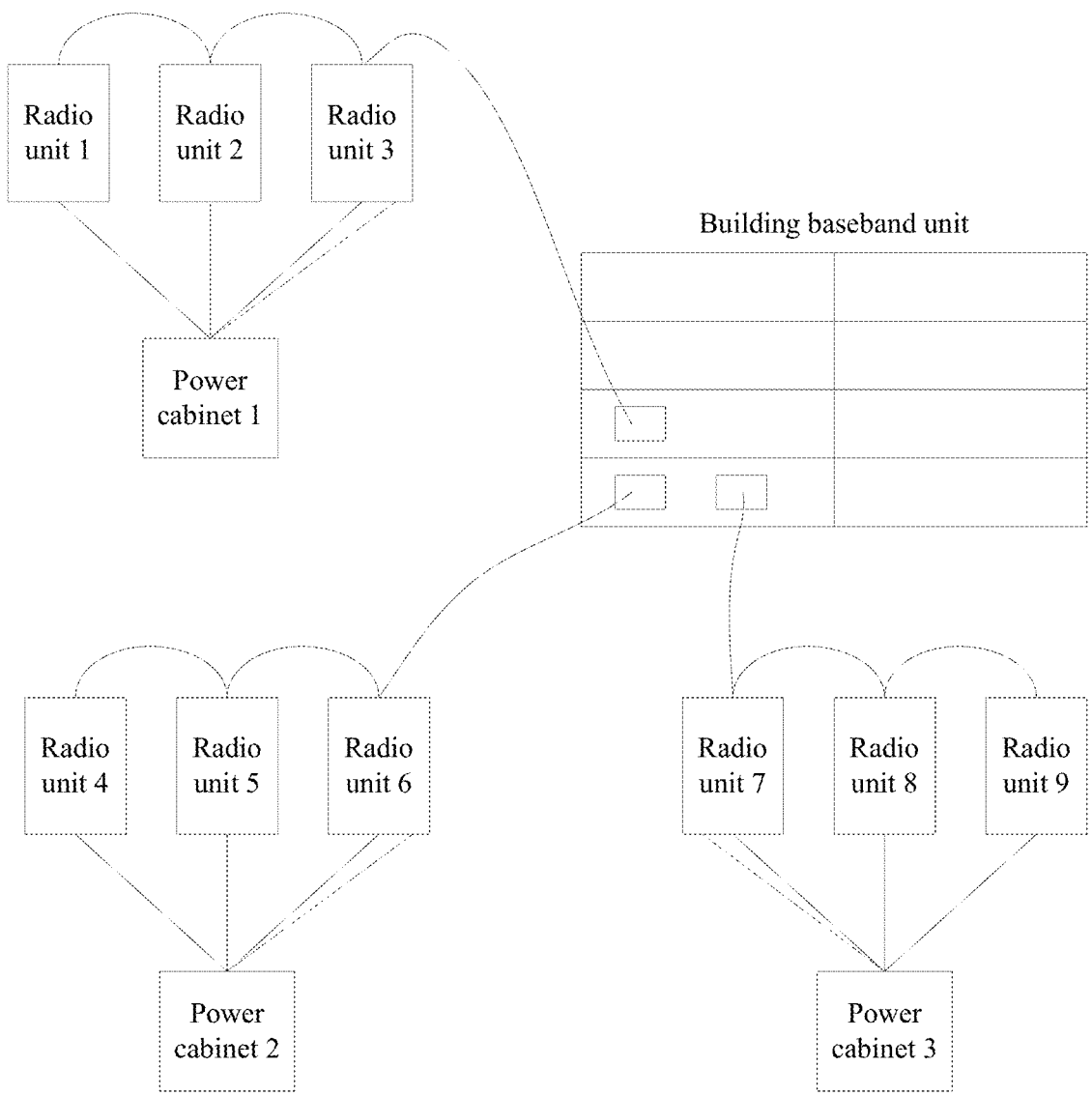
FIG. 1 is a schematic diagram of an application scenario according to an embodiment of the present invention.

An application scenario in an embodiment of the present invention is first described. FIG. 1 is a schematic diagram of a distributed power supply scenario. In FIG. 1, a BBU is stacked in centralized deployment. For example, the BBU includes eight grooves, and each groove includes one or more interfaces, configured to connect to RUs. A box in the groove in FIG. 1 represents an interface. The RU is deployed by using a remote optical fiber through a common public radio interface (Common Public Radio Interface, CPRI), and the RU obtains power as near as possible. It can be seen that an RU 1, an RU 2, and an RU 3 are connected to a power cabinet 1 through power cables, and are supplied with power by the power cabinet 1. If a mains supply outage occurs on the power cabinet 1, the RU 1, the RU 2, and the RU 3 are supplied with power by a set of standby power system. An RU 4, an RU 5, and an RU 6 are connected to a power cabinet 2 through power cables, and are supplied with power by the power cabinet 2. If a mains supply outage occurs on the power cabinet 2, the RU 4, the RU 5, and the RU 6 are supplied with power by a set of standby power system. An RU 7, an RU 8, and an RU 9 are connected to a power cabinet 3 through power cables, and are supplied with power by the power cabinet 3. If a mains supply outage occurs on the power cabinet 3, the RU 7, the RU 8, and the RU 9 are supplied with power by a set of standby power system. The three sets of standby power systems are not drawn in FIG. 1.

In addition, the RU 1 and the RU 2 are connected through a CPRI cable, the RU 2 and the RU 3 are connected through a CPRI cable, the RU 3 is connected to the BBU through a CPRI cable, the RU 4 and the RU 5 are connected through a CPRI cable, the RU 5 and the RU 6 are connected through a CPRI cable, the RU 6 is connected to the BBU through a CPRI cable, the RU 7 and the RU 8 are connected through a CPRI cable, the RU 8 and the RU 9 are connected through a CPRI cable, and the RU 7 is connected to the BBU through a CPRI cable. There are two connection cables between the RU 3 and the power cabinet 1. One is a power cable, and the other is a monitor cable, configured to transmit some control information. Similarly, a power cable and a monitor cable connect the RU 6 and the power cabinet 2, and a power cable and a monitor cable connect the RU 7 and the power cabinet 3. In FIG. 1, for differentiation, a monitor cable is represented by a dashed line, a power cable is represented by a straight line, and a CPRI cable is represented by a curved line.

At a moment, for example, when a mains supply outage occurs on the power cabinet 1, only the RU 1 to the RU 3 are actually affected. To be specific, the RU 1 to the RU 3 may switch from a state of being supplied with power by a mains supply to a state of being supplied with power by a standby power system, but the RU 4 to the RU 9 work normally, that is, the RU 4 to the RU 9 continue to be supplied with power by the mains supply. However, according to a processing manner in the prior art, the BBU instructs all of the nine RUs to reduce power consumption. This apparently affects performance of the RU4 to the RU 9. In view of this, this embodiment of the present invention provides a power outage processing method applicable to the distributed power supply scenario. In this embodiment of the present invention, if determining a power outage has occurred on a power source, a controller determines, based on connection relationships between power sources and radio units, a radio unit connected to the power source, and instructs at least one of radio units connected to the power source to reduce power consumption, that is, the controller instructs a radio unit affected by a power source on which a power outage has occurred to reduce power consumption. For a radio unit connected to a power source on which no power outage has occurred, the controller does not instruct the radio unit to reduce power consumption. In this way, power consumption of a radio unit connected to a power source on which a power outage has occurred, and working time of the radio unit is prolonged; and performance of a radio unit supplied with power normally can be ensured, and the radio unit supplied with power normally can continue to work normally without being affected.

The following describes the technical solutions provided in the embodiments of the present invention with reference to the accompanying drawings of this specification.

Referring to FIG. 2, an embodiment of the present invention provides a power outage processing method implemented by using the application scenario shown in FIG. 1 as an example.

Step 201: A controller in a base station receives notification information sent by a first power source, where the notification information is used to indicate that a power outage has occurred on the first power source; the base station includes M radio units, and the M radio units are supplied with power by N power sources, where each power source is connected to at least one radio unit, to supply power to the at least one radio unit; the first power source is one of the N power sources, and the N power sources are all supplied with power by using a power grid, where M is an integer greater than or equal to 2, and N is a positive integer.

Step 202: The controller determines, based on connection relationships between the N power sources and the M radio units, a radio unit connected to the first power source.

Step 203: The controller instructs all or some of radio units connected to the first power source to reduce power consumption.

In this embodiment of the present invention, the controller may be implemented by the BBU. Certainly, if the base station has a different architecture, the controller may be implemented by another device. This is not limited in this embodiment of the present invention.

In this embodiment of the present invention, the controller may obtain in advance the connection relationships between the N power sources and the M RUs. For example, the controller obtains the connection relationships between the N power sources and the M RUs when no power outage has occurred on any of all the power sources, so that the controller can perform corresponding processing when a power outage has occurred on a power source. FIG. 1 is used as an example, where N=3 and M=9, and the controller knows in advance that the RU 1 to the RU 3 are connected to the power cabinet 1, the RU 4 to the RU 6 are connected to the power cabinet 2, and the RU 7 to the RU 9 are connected to the power cabinet 3. The controller may receive a connection relationship, sent by each of the N power sources, between the power source and the at least one radio unit; and/or the controller receives a connection relationship, sent by each of the M radio units, between the radio unit and a power source, so that the controller can obtain the connection relationships between the N power sources and the M RUs. Specifically, a manner in which the controller obtains the connection relationships between the N power sources and the M RUs by using received information is described in the following embodiment.

Any power source that supplies power to an RU is supplied with power by a mains supply. If a power outage has occurred on a power source, the power source may send notification information to the controller. After receiving the notification information, the controller knows that the power outage has occurred on the power source. FIG. 1 is used as an example. For example, the power cabinet 1 is the first power source. When a power outage has occurred on the power cabinet 1, notification information is sent to the controller. Because the power cabinet 1 is not directly connected to the controller, the power cabinet 1 sends the notification information to the RU 3 through the monitor cable between the power cabinet 1 and the RU 3, and the RU 3 sends the notification information to the controller.

After receiving the notification information, if the controller knows that the power outage has occurred on the power source, the controller determines an RU connected to the power source. If the first power source is the power cabinet 1 in FIG. 1, the controller may determine, based on the already known connection relationships between the N power sources and the M RUs, that RUs connected to the power cabinet 1 include the RU 1, the RU 2, and the RU 3, so that the controller may instruct all or some of the RU 1, the RU 2, and the RU 3 to reduce power consumption, that is, instruct all or some of RUs affected by the power source on which the power outage has occurred to reduce power consumption. For radio units connected to power sources on which no power outage has occurred, for example, the RU 4 to the RU 9, the controller does not instruct the RU 4 to the RU 9 to reduce power consumption. In this way, power consumption of an RU connected to the power source on which the power outage has occurred, and working time of the RU is prolonged; and performance of an RU supplied with power normally can be ensured, and the RU supplied with power normally can continue to work normally without being affected.

In the distributed power supply scenario, deployed RUs may be used in different cells to complete different work. Some cells may be relatively important, or some RUs undertake work of a relatively high priority. If power consumption of such RUs is reduced, impact is relatively large. Therefore, at least two working modes may be configured for an RU. One working mode is a working mode in which power consumption reduction is allowed, and the other working mode is a working mode in which power consumption reduction is not allowed. The two working modes may be switched by using a switch. When the switch is on, the RU enters the working mode in which power consumption reduction is allowed; when the switch is off, the RU enters the working mode in which power consumption reduction is not allowed. Certainly, the two working modes may also be switched in other manners. This is not limited in this embodiment of the present invention. The switch may be disposed in the RU, that is, each RU is provided with a switch. In this way, each RU may be controlled independently, and a granularity is relatively fine. Alternatively, the switch may be disposed in a cell, that is, each cell is provided with a switch. In this way, overall control may be performed on the RU included in the cell, and control difficulty is reduced.

If the at least two working modes are configured for the RU, before the controller instructs all or some of the RUs connected to the first power source to reduce power consumption, the controller first needs to determine whether the RUs connected to the first power source are in the working mode in which power consumption reduction is allowed. If some of RUs connected to the first power source are in the working mode in which power consumption reduction is allowed, the controller may instruct the RUs to reduce power consumption. If some of RUs connected to the first power source are in the working mode in which power consumption reduction is not allowed, that is, are not in the working mode in which power consumption reduction is allowed, the controller does not instruct the RUs to reduce power consumption. In other words, the RUs connected to the first power source may be processed depending on cases. Power consumption of an RU in the working mode in which power consumption reduction is allowed can be reduced. Power consumption of an RU in the working mode in which power consumption reduction is not allowed may not need to be reduced.

If a switch for working mode switching is disposed in an RU, the controller may determine, based on an on/off status of a switch on each RU, whether the RU is in the working mode in which power consumption reduction is allowed, and control the RU independently. If a switch for working mode switching is disposed in a cell, the controller may determine a cell to which the at least one RU belongs, and determine, based on an on/off status of a switch in the cell to which the at least one RU belongs, whether the at least one RU is in the working mode in which power consumption reduction is allowed. If a switch in a cell is on, all RUs in the cell are in the working mode in which power consumption reduction is allowed. If a switch of a cell is off, all RUs in the cell are in the working mode in which power consumption reduction is not allowed, so that centralized control of RUs in each cell is performed.

In a possible implementation, the controller may further monitor and maintain a status of each RU of the base station, and the status herein is mainly a power supply status, so that the controller can know whether the RU is working through mains supply provided by a power source or is working by using a standby power system. After the controller receives the notification information sent by the first power source, the controller may monitor a status of an RU connected to the first power source. In this case, the RU connected to the first power source should have switched from a state of working through mains supply provided by the first power source to a state of working by using a standby power system, and the controller may update the status of the locally maintained RU connected to the first power source, so that the status of the RU locally maintained by the controller is the same as an actual status of the RU. In addition, the controller knows clearly a current power supply status of each RU, and therefore the controller can accurately and precisely perform an operation of power consumption reduction in a targeted manner, and avoid incorrect power consumption reduction processing of an RU in a normal power supply state.

In a possible implementation, there may be only one RU or a plurality of RUs connected to the first power source. If there is only one RU, and the controller determines that the RU is in the working mode in which power consumption reduction is allowed, the controller may instruct the RU to reduce power consumption. If there are a plurality of RUs, the controller determines working modes of the plurality of RUs. Some of the RUs may be in the working mode in which power consumption reduction is allowed, and the other RUs may be in the working mode in which power consumption reduction is not allowed, or all RUs may be in the working mode in which power consumption reduction is allowed, or all RUs may be in the working mode in which power consumption reduction is not allowed. If all of the plurality of RUs are in the working mode in which power consumption reduction is not allowed, the controller does not perform instruction, that is, power consumption of any of the plurality of RUs does not need to be reduced. If some of the plurality of RUs are in the working mode in which power consumption reduction is allowed, or all of the plurality of RUs are in the working mode in which power consumption reduction is allowed, the controller may instruct some or all of the RUs in the working mode in which power consumption reduction is allowed, to reduce power consumption.

A plurality of RUs may be disposed in a base station, and different RUs may correspond to different frequency bands, or different RUs may process different services. Specific RUs connected to the first power source and in the working mode in which power consumption reduction is allowed are instructed to reduce power consumption, and a specific amount of power consumption to be reduced vary based on different cases. For example, selection is performed based on different priorities of services processed by RUs. In this case, an RU processing a lower-priority service is preferentially instructed to reduce power consumption, and a lower priority of a processed service indicates that more power consumption may be reduced. For an RU processing a higher-priority service, the RU may be instructed, after a delay of a period of time, to reduce power consumption, or may be instructed to reduce a relatively small amount of power consumption, or even none of the RUs is instructed to reduce power consumption, to ensure as much as possible that a high-priority service works normally.

If the controller determines to instruct an RU to reduce power consumption, the controller sends first indication information to the RU, where the first indication information is used to instruct the RU to reduce power consumption. After receiving the first indication information, the RU performs power consumption reduction processing. A manner for power consumption reduction processing includes but is not limited to at least one of the following manners such as restricting power scheduling, reducing pilot power, closing some radio frequency transmit channels, and closing some carrier frequencies, and may further include another possible manner. This is not limited in this embodiment of the present invention.

In a possible implementation, after instructing all or some of the RUs connected to the first power source to reduce power consumption, the controller may further instruct the RUs with reduced power consumption to restore to the original power consumption, that is, to return to a working state in which power consumption is not reduced, that is, to terminate a state in which power consumption is reduced and restore to the working state in which power consumption is not reduced, so that services of the RUs with reduced power consumption return to normal. A condition for instructing an RU with reduced power consumption to restore to original power consumption includes but is not limited to the following:

1. It is determined that the first power source has recovered from the power outage.

If the mains supply that supplies power to the first power source returns to normal, the first power source may provide a notification to the controller, and the controller determines that the first power source has restarted to supply power to the RU. Alternatively, the controller may monitor a status of the RU in real time or periodically. If discovering that the RU connected to the first power source has switched from a state of working by using a standby power system to a state of working through mains supply provided by the first power source, the controller determines that the first power source has restarted to supply power to the RU.

If determining that the first power source has recovered from the power outage, the controller may instruct the RU whose power consumption is reduced previously and that is connected to the first power source to restore to the original power consumption.

2. It is determined that at least one RU enters the working mode in which power consumption reduction is not allowed.

If a switch, for working mode switching, of an RU in the RUs whose power consumption is reduced previously and that are connected to the first power source is changed from on to off, it indicates that the RU enters the working mode in which power consumption reduction is not allowed. The controller may instruct the RU to restore to the original power consumption.

Alternatively, if a switch, for working mode switching, of a cell in which some of the RUs whose power consumption is reduced previously and that are connected to the first power source are located is changed from on to off, it indicates that the cell enters the working mode in which power consumption reduction is not allowed. The controller may instruct the RUs that belong to the cell and that are in the RUs whose power consumption is reduced previously and that are connected to the first power source, to restore to the original power consumption.

The foregoing two conditions may be used independently or may be combined for use.

For example, the controller sends second indication information to an RU that needs to restore to original power consumption, where the second indication information is used to instruct the RU to restore to the original power consumption. After receiving the second indication information, the corresponding RU may perform processing for restoring to the power consumption. A processing manner for restoring to the power consumption is corresponding to the manner for power consumption reduction processing, and details are not described.

The following content is described in this embodiment of the present invention. The base station may instruct, based on the connection relationships between the N power sources and the M RUs, an RU connected to the power source on which the power outage has occurred, to reduce power consumption, with no need to instruct all RUs to reduce power consumption, ensuring that an RU supplied with power by a power source works normally. In the following, another embodiment of the present invention is described. In the following embodiment, how to obtain connection relationships between N power sources and M RUs by a controller is described.

Figure 3:
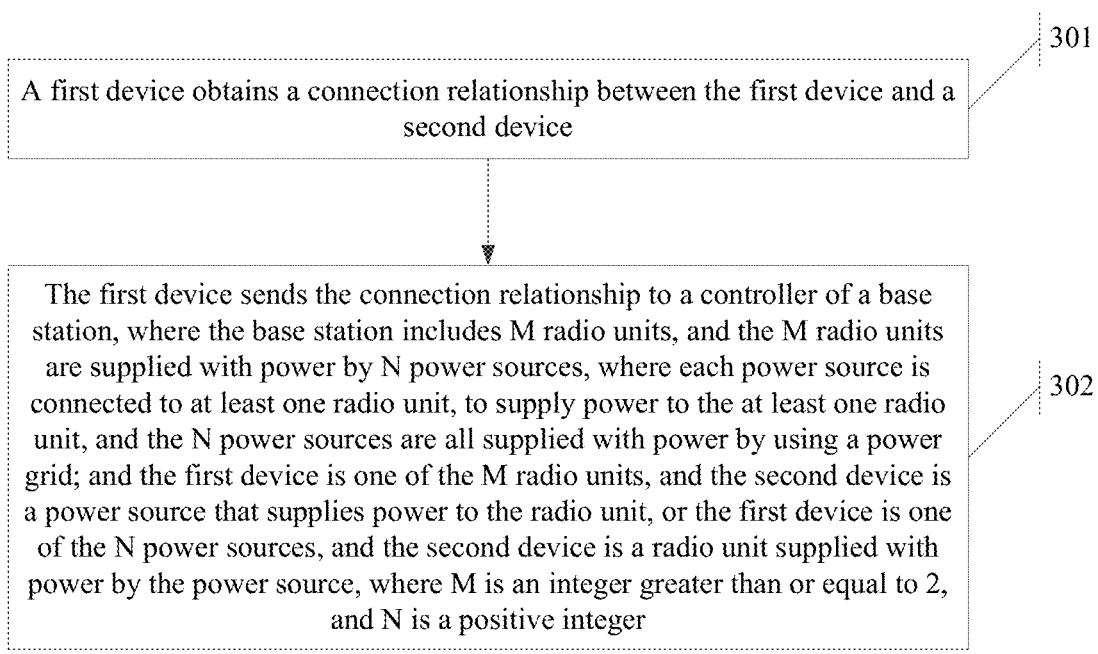
FIG. 3 is a flowchart of a connection relationship obtaining method according to an embodiment of the present invention.

Referring to FIG. 3, an embodiment of the present invention provides a connection relationship obtaining method implemented by using the application scenario shown in FIG. 1 as an example.

Step 301: A first device obtains a connection relationship between the first device and a second device.

Step 302: The first device sends the connection relationship to a controller of a base station, where the base station includes M radio units, and the M radio units are supplied with power by N power sources, where each power source is connected to at least one radio unit, to supply power to the at least one radio unit, and the N power sources are all supplied with power by using a power grid; and the first device is one of the M radio units, and the second device is a power source that supplies power to the radio unit, or the first device is one of the N power sources, and the second device is a radio unit supplied with power by the power source, where M is an integer greater than or equal to 2, and N is a positive integer.

In this embodiment of the present invention, the first device may be a power source that supplies power to any RU in the base station, or may be any RU in the base station. In other words, in this embodiment of the present invention, a power source or an RU obtains a connection relationship between a power source and an RU, and sends the obtained connection relationship to the controller, so that the controller obtains the connection relationship.

FIG. 1 is used as an example. The base station includes the N power sources and the M RUs. If an RU obtains a connection relationship, each RU may obtain a connection relationship between the RU and a power source, that is, each RU may determine which power source is connected to the RU, and sends the obtained connection relationship to the controller. After receiving the connection relationships sent by all the RUs, the controller may determine the overall connection relationships between the N power sources and the M RUs. Alternatively, if a power source obtains a connection relationship, each power source may determine which RU is connected to the power source, and sends the obtained connection relationship to the controller. After receiving the connection relationships sent by all the power sources, the controller may determine the overall connection relationships between the N power sources and the M RUs. It should be noted that if the power source is directly connected to the controller, the power source may directly send the connection relationship to the controller; while as shown in FIG. 1, if the power source is not directly connected to the controller, the power source may send the connection relationship to an RU connected to the power source, and the RU sends the connection relationship to the controller. The power source usually sends, through a monitor cable, the connection relationship to the RU connected to the power source. The RU may obtain the connection relationship independently, and the power source does not need to obtain the connection relationship; or the power source may obtain the connection relationship independently, and the RU does not need to obtain the connection relationship; or both the power source and the RU each may obtain the connection relationship, and send the obtained connection relationship to the controller. The controller determines the connection relationships between the N power sources and the M RUs based on all information sent by the power source and the RU, so that the obtained connection relationships between the N power sources and the M RUs are more accurate.

The power cabinet 1 in FIG. 1 is used as an example. The power cabinet 1 is connected to the RU 1, the RU 2, and the RU 3, where the power cabinet 1 is connected to each of the three RUs through a power cable, and is also connected to the RU 3 through a monitor cable. Generally, the power cable can only be used to transmit an electrical signal, and cannot be used to transmit a signal of another type. To enable the RU to obtain a connection relationship in a manner of intercommunication with the power source, or to enable the power source to obtain a connection relationship in a manner of intercommunication with the RU, in this embodiment of the present invention, the RU and the power source may be improved, so that the RU and the power source can transmit other information in addition to an electrical signal through the power cable. For example, both the RU and the power source are improved to support a power line communication (Power Line Communication, PLC) function. When the power source and the RU that are connected to each other both support the PLC function, the RU and the power source may communicate with each other by using the PLC function through the power cable, to know a physical connection relationship of each other. Certainly, this embodiment of the present invention is not limited to the PLC function, and any function that enables the RU and the power source to communicate with each other is applicable.

The RU or the power source of the base station may send the connection relationship to the controller when power supply of the power source is normal, so that processing may be performed in a timely manner when a power outage has occurred on a power source. According to the manner in this embodiment of the present invention, the RU or the power source can obtain a physical connection relationship without changing original circuit deployment, so that the controller can perform control in a targeted manner. The method is relatively simple, and implementation costs are relatively low.

This embodiment of the present invention and the embodiment shown in FIG. 2 may be understood as a whole. In other words, in the embodiment shown in FIG. 2, the controller may obtain a connection relationship based on the manner provided in this embodiment of the present invention. In this embodiment of the present invention, for example, the first device is a power source; and if the first device determines that a power outage has occurred on the first device, the first device sends notification information to the controller, to indicate that the power outage has occurred on the first device. Alternatively, for example, the first device is an RU; and if a power outage has occurred on a power source connected to the RU, the RU may also receive first indication information sent by the controller, where the first indication information is used to instruct the RU to reduce power consumption. After power consumption of the RU is reduced, if the power source connected to the RU has recovered from the power outage, or the RU enters a working mode in which power consumption reduction is not allowed, the RU receives second indication information sent by the controller, where the second indication information is used to instruct the RU to restore to the original power consumption. For specific processing manners for reducing power consumption and restoring to the original power consumption by the RU, refer to related descriptions in the embodiment shown in FIG. 2.

In this embodiment of the present invention, a problem of prolonging duration of a standby power system of the base station in a distributed power supply scenario is resolved. The solution provided in this embodiment of the present invention can effectively prolong duration of the standby power system of the base station. Certainly, specific duration that can be prolonged is related to a quantity of RUs whose power consumption is reduced, a specific method used by an RU for reducing power consumption, and another factor.

With reference to accompanying drawings, the following describes devices provided in embodiments of the present invention.

Figure 4:
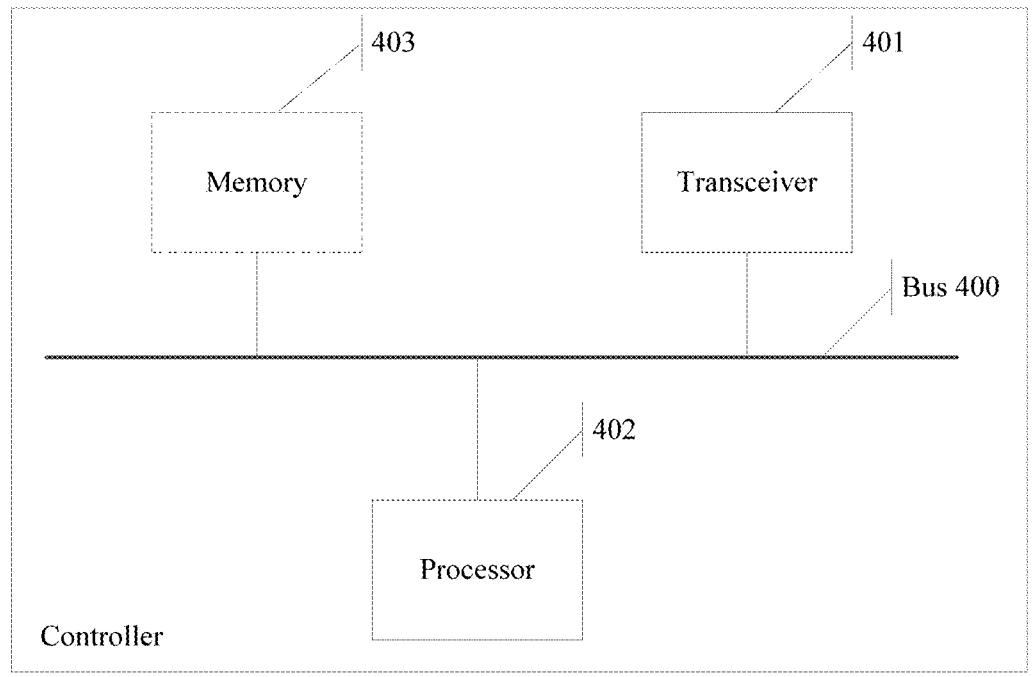
FIG. 4 is a schematic structural diagram of a controller according to an embodiment of the present invention.

Referring to FIG. 4, an embodiment of the present invention provides a controller, where the controller is a controller of a base station, and the controller includes a transceiver 401 and a processor 402.

The transceiver 401 may communicate with an RU in a wired manner. If a power source is not directly connected to the controller, information sent by the RU and received by the transceiver 401 may include information generated by the RU, and may further include information forwarded by the power source by using the RU. Alternatively, if the controller is directly connected to the power source, the transceiver 401 may also directly communicate with the power source. Functions of the transceiver 401 for receiving information and sending information may be implemented by using a same interface, or may be implemented by using different interfaces.

The processor 402 may include a central processing unit (CPU) or an application-specific integrated circuit (Application Specific Integrated Circuit, ASIC), may include one or more integrated circuits configured to control program execution, may include a hardware circuit developed by using a field programmable gate array (Field Programmable Gate Array, FPGA), may include a micro control unit (Microcontroller Unit, MCU), or may include a baseband chip.

In a possible implementation, the controller may further include a memory 403, and is also shown in FIG. 4. The memory 403 is not a necessary component, and therefore the memory 403 is drawn in a dashed line in FIG. 4, to differentiate with a necessary component. There may be one or more memories 403. The memory 403 may include a read-only memory (Read Only Memory, ROM), a random access memory (Random Access Memory, RAM), a magnetic disk memory, and the like. The memory 403 may be configured to store program code required by the processor 402 to execute a task, and may be further configured to store data.

The transceiver 401 and the memory 403 may be connected to the processor 402 by using a bus 400 (this is used as an example in FIG. 4) or connected to the processor 402 by using a dedicated connection cable.

The processor 402 is designed and programmed to embed code corresponding to the aforementioned methods into the chip, so that during running, the chip can perform the method provided in the embodiment shown in FIG. 2 or the embodiment shown in FIG. 3. How to design and program the processor 402 is a technology well known to a person skilled in the art, and details are not described herein.

The controller may be configured to implement the methods provided in the embodiment shown in FIG. 2 and the embodiment shown in FIG. 3. For example, the controller may be the BBU shown in FIG. 1, or may be the controller in any of the embodiments shown in FIG. 2 and FIG. 3. Therefore, for functions and the like implemented by the units of the controller, refer to the descriptions of the foregoing embodiments, and details are not further described.

Figure 5:
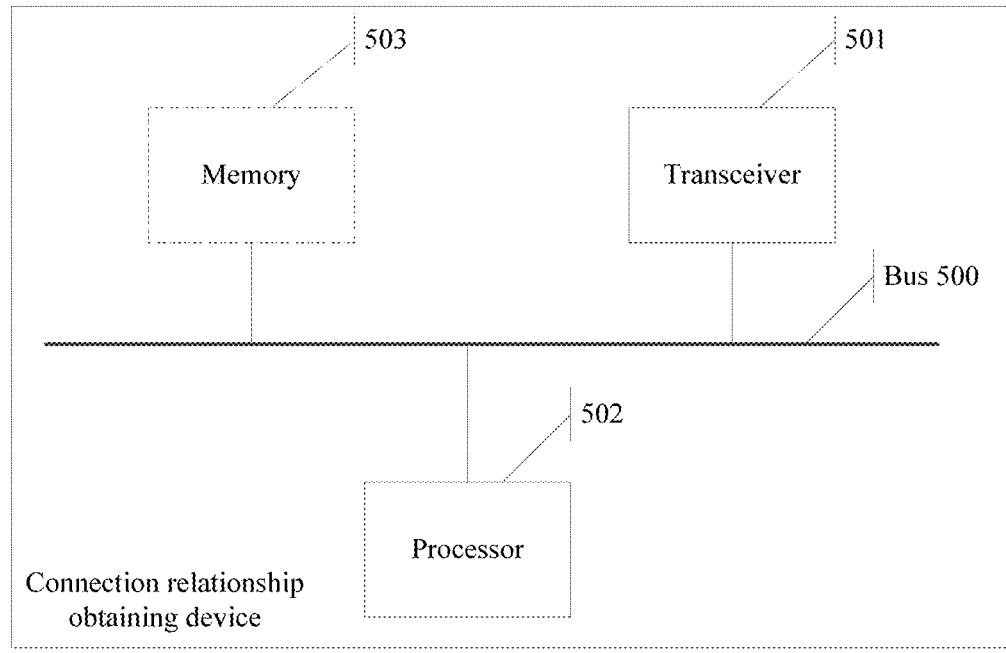
FIG. 5 is a schematic structural diagram of a connection relationship obtaining device according to an embodiment of the present invention.

Referring to FIG. 5, an embodiment of the present invention provides a connection relationship obtaining device, where the device may be an RU or a power source of a base station, and the device includes a transceiver 501 and a processor 502.

The transceiver 501 may communicate with another device in a wired manner. If the device is an RU, the transceiver 501 may communicate with a controller of the base station in a wired manner. Alternatively, if the device is a power source, and the power source is directly connected to the controller of the base station, the transceiver 501 may communicate with the controller of the base station in a wired manner; or if the device is a power source, and the power source is not directly connected to the controller of the base station, the transceiver 501 may communicate with an RU in a wired manner, to perform information exchange with the RU, and forward information to the controller of the base station by using the RU. Functions of the transceiver 501 for receiving information and sending information may be implemented by using a same interface, or may be implemented by using different interfaces.

The processor 502 may include a CPU or an ASIC, may include one or more integrated circuits configured to control program execution, may include a hardware circuit developed by using an FPGA, may include an MCU, or may include a baseband chip.

In a possible implementation, the device may further include a memory 503, and is also shown in FIG. 5. The memory 503 is not a necessary component, and therefore the memory 503 is drawn in a dashed line in FIG. 5, to differentiate with a necessary component. There may be one or more memories 503. The memory 503 may include a ROM, a RAM, a magnetic disk memory, and the like. The memory 503 may be configured to store program code required by the processor 502 to execute a task, and may be further configured to store data.

The transceiver 501 and the memory 503 may be connected to the processor 502 by using a bus 500 (this is used as an example in FIG. 5) or connected to the processor 502 by using a dedicated connection cable.

The processor 502 is designed and programmed to embed code corresponding to the aforementioned methods into the chip, so that during running, the chip can perform the method provided in the embodiment shown in FIG. 2 or the embodiment shown in FIG. 3. How to design and program the processor 502 is a technology well known to a person skilled in the art, and details are not described herein.

The device may be configured to implement the methods provided in the embodiment shown in FIG. 2 and the embodiment shown in FIG. 3. For example, the device is an RU or a power source shown in FIG. 1, or the RU or the power source in the embodiment shown in FIG. 2, or the first device in the embodiment shown in FIG. 3. Therefore, for functions and the like implemented by the units of the device, refer to the descriptions of the foregoing embodiments, and details are not further described.

Figure 6:
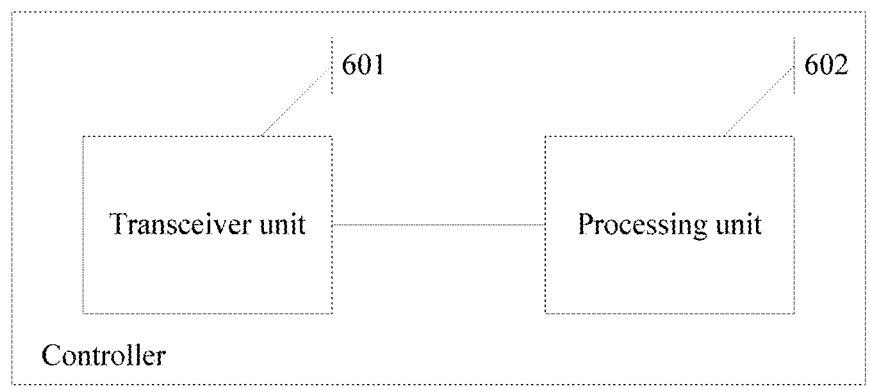
FIG. 6 is a schematic structural diagram of a controller according to an embodiment of the present invention.

Referring to FIG. 6, based on a same inventive concept, an embodiment of the present invention provides a controller. The controller is a controller of a base station, and the controller includes a transceiver unit 601 and a processing unit 602.

In actual application, an entity device corresponding to the transceiver unit 601 may be the transceiver 401 in FIG. 4, and an entity device corresponding to the processing unit 602 may be the processor 402 in FIG. 4.

The controller may be configured to implement the methods provided in the embodiment shown in FIG. 2 and the embodiment shown in FIG. 3. For example, the controller may be the BBU shown in FIG. 1, or may be the controller in any of the embodiments shown in FIG. 2 and FIG. 3. Therefore, for functions and the like implemented by the units of the controller, refer to the descriptions of the foregoing embodiments, and details are not further described.

Figure 7:
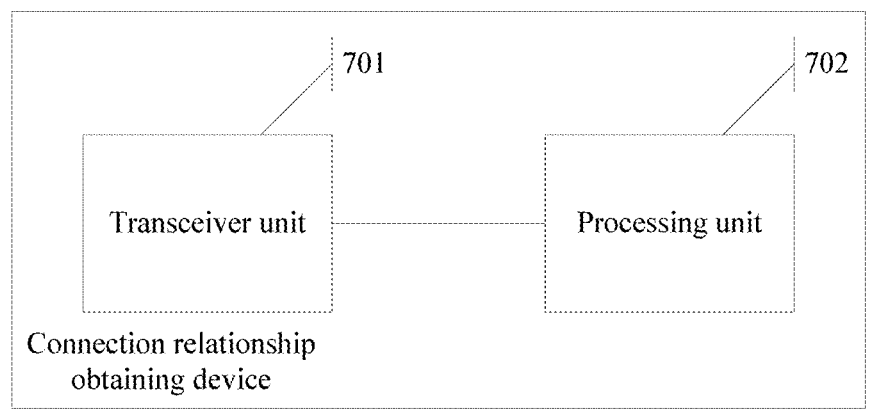
FIG. 7 is a schematic structural diagram of a connection relationship obtaining device according to an embodiment of the present invention.

Referring to FIG. 7, based on a same inventive concept, an embodiment of the present invention provides a connection relationship obtaining device. The connection relationship obtaining device includes a transceiver unit 701 and a processing unit 702.

In actual application, an entity device corresponding to the transceiver unit 701 may be the transceiver 501 in FIG. 5, and an entity device corresponding to the processing unit 702 may be the processor 502 in FIG. 5.

The device may be configured to implement the methods provided in the embodiment shown in FIG. 2 and the embodiment shown in FIG. 3. For example, the device is an RU or a power source shown in FIG. 1, or the RU or the power source in the embodiment shown in FIG. 2, or the first device in the embodiment shown in FIG. 3. Therefore, for functions and the like implemented by the units of the device, refer to the descriptions of the foregoing embodiments, and details are not further described.

In the embodiments of the present invention, if determining that a power outage has occurred on a first power source, the controller determines, based on connection relationship between power sources and radio units, a radio unit connected to the first power source, and instructs all or some of radio units connected to the first power source to reduce power consumption, that is, instructs a radio unit affected by a power source on which a power outage has occurred to reduce power consumption. For a radio unit connected to a power source on which no power outage has occurred, the controller does not instruct the radio unit to reduce power consumption. In this way, power consumption of a radio unit connected to a power source on which a power outage has occurred, and working time of the radio unit is prolonged; and performance of a radio unit supplied with power normally can be ensured, and the radio unit supplied with power normally can continue to work normally without being affected.

In the present invention, it should be understood that the disclosed device and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical or other forms.

An embodiment of the present invention further provides a computer storage medium. The computer storage medium may store a program, and when the program is executed, some or all of steps of any ranging method recorded in the foregoing method embodiments are performed.

Functional units in the embodiments of the present invention may be integrated into one processing unit, or each unit may be an independent physical module.

When the integrated unit is implemented in a form of a software functional unit and sold or used as an independent product, the integrated unit may be stored in a computer readable storage medium. Based on such an understanding, all or some of technical solutions of the present invention may be implemented in a form of a software product. The software product is stored in a storage medium and includes several instructions for instructing a computer device, such as a personal computer, a server, a network device, or a processor (processor) to perform all or some of the steps of the methods described in the embodiments of the present invention. The foregoing storage medium includes: any medium that can store program code, such as a Universal Serial Bus flash drive (Universal Serial Bus flash drive), a removable hard disk, a ROM, a RAM, a magnetic disk, or an optical disc.

The foregoing embodiments are merely used to describe the technical solutions of the present invention. The foregoing embodiments are merely intended to help understand the method of the embodiments of the present invention, and shall not be construed as a limitation on the embodiments of the present invention. Any variation or replacement readily figured out by a person skilled in the art shall fall within the protection scope of the embodiments of the present invention.

What is claimed is:

1. A power outage processing method, comprising:
 receiving, by a controller in a base station, notification information sent by a first power source, wherein:
  the notification information is used to indicate that a power outage has occurred on the first power source;
  the base station comprises M radio units;
  each of the M radio units comprises a switch;
  each of the M radio units is configured to have at least two working modes,
 wherein each of the M radio units is operating in one of the at least two working modes;
  the M radio units are supplied with power by N power sources including at least the first power source and a second power source;
  each of the N power sources is connected to at least one radio unit to supply power to the at least one radio unit;
  the N power sources are all supplied with power by using a power grid; and
  M is an integer greater than or equal to 2 and N is a positive integer;
 setting, for each radio unit of the M radio units, a working mode of the radio unit using the switch, wherein, when the switch has a status of ON, the working mode of the radio unit allows power consumption reduction, and when the switch has the status of OFF, the working mode of the radio unit does not allow power consumption reduction;
 determining, by the controller based on connection relationships between the N power sources and the M radio units, a radio unit connected to the first power source;
 determining, by the controller, the working mode for each of the M radio units connected to the first power source based on the status of the switch for each of the M radio units; and
 instructing, by the controller, less than all of the M radio units connected to the first power source to reduce power consumption based in part on the working mode for each of the M radio units such that:
  a first subset of the M radio units that have the switch with the status of OFF are being powered by one or more second power sources at a normal power consumption; and
  a second subset of the M radio units that have the switch with the status of ON are being power by the one or more second power sources at the reduced power consumption.

2. The method according to claim 1, wherein after instructing, by the controller, the less than all of the M radio units connected to the first power source to reduce power consumption, the method further comprises:
 determining, by the controller, that the first power source has recovered from the power outage; and
 instructing, by the controller, the second subset of the M radio units with the reduced power consumption connected to the first power source to restore to the original normal power consumption.

3. The method according to claim 1, wherein the method further comprises:
 receiving, by the controller, a connection relationship, sent by each of the N power sources, between the power source and the at least one radio unit.

4. The method according to claim 1, wherein after instructing, by the controller, the less than all of the M radio units connected to the first power source to reduce power consumption, the method further comprises:
 determining, by the controller, that the second subset of the M radio units with the reduced power consumption connected to the first power source have entered the working mode in which power consumption reduction is not allowed; and
 instructing, by the controller, the second subset of the M radio units with the reduced power consumption connected to the first power source to restore to the original power consumption.

5. The method according to claim 1, wherein the method further comprises:
 receiving, by the controller, a connection relationship, sent by each of the M radio units, between the radio unit and a power source.

6. The method according to claim 1, wherein the at least two working modes of the M radio units comprise a first working mode in which power consumption reduction is allowed and a second working mode is the working mode in which power consumption reduction is not allowed.

7. A controller, wherein the controller is a controller of a base station, and the controller comprises:
 a transceiver unit, configured to receive notification information sent by a first power source, wherein:
  the notification information is used to indicate that a power outage has occurred on the first power source;
  the base station comprises M radio units;
  each of the M radio units comprises a switch;

each of the M radio units is configured to have at least two working modes, wherein each of the M radio units is operating in one of the at least two working modes;

the M radio units are supplied with power by N power sources including at least the first power source and a second power source;

each of the N power sources is connected to at least one radio unit to supply power to the at least one radio unit;

the N power sources are all supplied with power by using a power grid; and

M is an integer greater than or equal to 2 and N is a positive integer; and a processing unit, configured to:
   set, for each radio unit of the M radio units, a working mode of the radio unit using the switch, wherein, when the switch has a status of ON, the working mode of the radio unit allows power consumption reduction, and when the switch has the status of OFF, the working mode of the radio unit does not allow power consumption reduction;
   determine, based on connection relationships between the N power sources and the M radio units, a radio unit connected to the first power source;
   determine the status of the switch of the radio unit connected to the first power source;
   determine the working mode for the radio unit connected to the first power source based on the status of the switch; and
   instruct less than all of the M radio units connected to the first power source to reduce power consumption based in part on the working mode for each of the M radio units such that:
      a first subset of the M radio units that have the switch with the status of OFF are being powered by one or more standby power systems at a normal power consumption; and
      a second subset of the M radio units that have the switch with the status of ON are being power by the one or more standby power systems at the reduced power consumption.

8. The controller according to claim 7, wherein the processing unit is further configured to:
   after instructing the less than all of the M radio units connected to the first power source to reduce power consumption, determine that the first power source has recovered from the power outage; and
   instruct the second subset of the M radio units with the reduced power consumption connected to the first power source to restore to the normal power consumption.

9. The controller according to claim 7, wherein the transceiver unit is further configured to:
   receive a connection relationship, sent by each of the N power sources, between the power source and the at least one radio unit.

10. The controller according to claim 7, wherein the processing unit is further configured to:
   after instructing the less than all of the M radio units connected to the first power source to reduce power consumption, determine that the second subset of the M radio units with the reduced power consumption connected to the first power source have entered the working mode in which power consumption reduction is not allowed; and
   instruct the second subset of the M radio units with the reduced power consumption connected to the first power source to restore to the original power consumption.

11. The controller according to claim 7, wherein the transceiver unit is further configured to:
   receive a connection relationship, sent by each of the M radio units, between the radio unit and a power source.

12. The controller according to claim 7, wherein the at least two working modes of the M radio units comprise a first working mode in which power consumption reduction is allowed and a second working mode is the working mode in which power consumption reduction is not allowed.

* * * * *